May 24, 1966 I. HAAS 3,253,197

TRANSISTOR HAVING A RELATIVELY HIGH INVERSE ALPHA

Filed June 21, 1962 2 Sheets-Sheet 1

INVENTOR.
ISY HAAS

BY

Flehr and Swain
ATTORNEYS

TRANSISTOR HAVING A RELATIVELY HIGH INVERSE ALPHA

Filed June 21, 1962 2 Sheets-Sheet 2

INVENTOR.
ISY HAAS

BY

Flehr and Swain
ATTORNEYS

United States Patent Office 3,253,197

Patented May 24, 1966

3,253,197

TRANSISTOR HAVING A RELATIVELY HIGH INVERSE ALPHA

Isy Haas, Cupertino, Calif., assignor to Amelco, Inc., Los Angeles, Calif., a corporation of California Filed June 21, 1962, Ser. No. 204,160

8 Claims. (Cl. 317—235)

This invention relates generally to a transistor, and more particularly to a transistor having high inverse alpha.

To maximize the alpha or transport factor of junction transistors, they are generally manufactured with a collector junction which is larger in size than the emitter junction to assure that substantially all the minority carriers which diffuse through the base layer are collected by the collector even if some spreading occurs. When transistors of this type are operated in a reverse connection, i.e., with the collector serving as "emitter" and the emitter as "collector," the inverse alpha is relatively poor since a substantial number of minority carriers do not reach the "collector."

Furthermore, in order to obtain a high injection efficiency, which is necessary for a high alpha, the doping of the emitter must be much higher than the base. Since this is not the case in a conventional diffused transistor, this also contributes to a low inverse alpha.

Where the switching circuits are formed by microcircuit techniques, it is desirable to be able to construct a plurality of devices on a single wafer without having to undergo elaborate measures for isolating and interconnecting the devices. Conventional transistors require isolation and ohmic interconnection. The reverse connection with common emitters would permit the formation of circuits having a number of transistors on a single wafer.

It is an object of the present invention to provide a transistor having a high inverse alpha.

It is another object of the present invention to provide a transistor structure which can be incorporated in integrated microcircuits having common emitter connections without requiring elaborate isolation or interconnection.

It is another object of the present invention to provide a transistor having a relatively high injection efficiency when operated in the inverse configuration.

It is another object of the present invention to provide a transistor which can be operated in the inverse configuration with minimum overlapping diode effect.

These and other objects of the invention will become more clearly apparent from the following description when taken in conjunction with the accompanying drawing.

Referring to the drawing.

Figure 1:
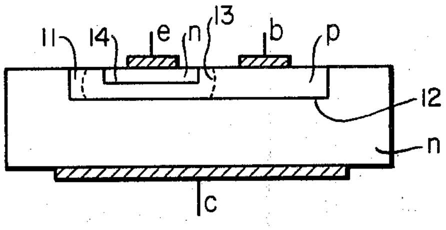
FIGURE 1 shows a sectional view of a prior art transistor.

Referring to FIGURE 1, a conventional transistor is illustrated. The transistor includes an *n*-type body forming the collector region. Ohmic contact is made to the collective region and a collector lead *c* is attached thereto. Inset into the *n*-type body is a *p*-type base region. Ohmic contact is made to the base region and base lead *b* is connected thereto. Inset into the *p*-type base region is an *n*-type emitter region. Ohmic contact is made to the emitter region and emitter lead *e* is connected thereto. Typical impurity thickness, concentrations and resistivities for the various regions are as follows:

*Base*

Depth—1.8 microns

Impurity concentration—$5\times10^{18}$ boron atoms per cm.$^3$

Sheet resistance$=V/I\cong15$ ohms/square

*Emitter*

Depth—1.5 microns

Impurity concentration—$10^{21}$ phosphorus atoms per cm.$^3$

Sheet resistance$=V/I=0.6$ ohm/square

*Collector*

Impurity concentration—$10^{15}$–$10^{16}$ atoms phosphorus per cm.$^3$

Sheet resistance $=V/I\cong1$ ohm/square.

Carriers injected at the emitter junction diffuse through the relatively thin portion 11 of the base region and are collected by the relatively large collector junction 12. Any carriers which spread outwardly from the emitter junction 14, as indicated by the dotted lines 13 which are representative of the average lifetime, are also collected by the collector junction. The transport factor (alpha) of the transistor is relatively high.

However, when a transistor of the foregoing character is operated in the reverse connection, that is, the collector junction is forward biased to act as the "emitter" to inject carriers into the base region and the emitter junction 14 is reverse biased to serve as the "collector" to collect the injected carriers, the alpha is relatively low since carriers not only tend to diffuse towards the "collector" region but into the remainder of the base region where they may recombine.

Figure 2:
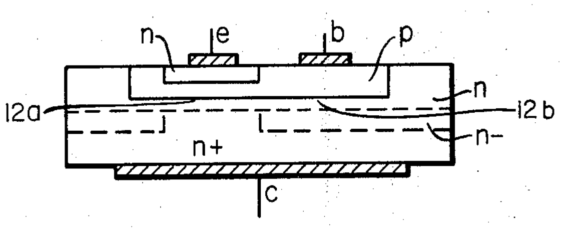
FIGURE 2 shows a transistor having a high inverse alpha.

Referring to FIGURE 2, there is shown a transistor in which the inverse transport factor (alpha) is relatively high. The transistor illustrated includes an *n*-type emitter region inset into an inset *p*-type base region. However, the inset regions are inset into an epitaxially grown *n*-type layer which is grown onto an $n+$ wafer which has a ring-like region of low impurity concentration $n-$ which leaves an $n+$ column disposed opposite the emitter region. The $n+$ column is made of substantially the same configuration and area as the emitter region. The column preferably has a higher impurity concentration than the collector region forming the base-collector region. For example, it may have an impurity concentration of $1.2\times10^{21}$ phosphorus atoms per cm.$^3$ giving a sheet resistance of 0.5 ohm/square, while the ring may have an impurity concentration of $10^{15}$ phosphorus atoms per cm.$^3$ giving a resistivity of 5 ohms cm.

Operation of the transistor with conventional connection is substantially identical to that described above. In the reverse connection, most of the carriers are injected by the portion 12*a* of the "emitter" junction which overlies the $n+$ column. This is due to the fact that the $n+$ column has a higher conductivity whereby the voltage drop through the column is relatively low in comparison to the remainder of the collector region to give a higher voltage at that portion of the junction 12*a* adjacent the column than at the other portions 12*b* of the collector junction overlying the $n-$ portions of the region. In the inverse configuration, the active portion of the "emitter" is substantially the same area as the "collector" which results in a relatively high alpha value.

In the configuration, however, there is still some loss of injection efficiency because of the forward bias applied to the other portions 12*b* of the "emitter" junction. This can be overcome to some extent by a device of the type shown in FIGURE 3 which, in place of the $n-$ region or ring surrounding the column, there is provided a $p$-type region or ring which leaves a relatively thin $n$-type region 18 adjacent the other portions 12$b$ of the junction. The resistance drops along this thin region are such as to reduce the bias on the adjacent portions 12$b$ of the "emitter" junction to reduce the injection in this portion of the junction.

Figure 3:
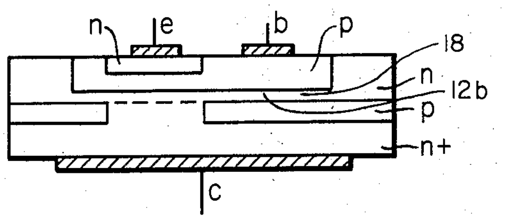
FIGURE 3 shows another transistor having high inverse alpha.
Figure 4:
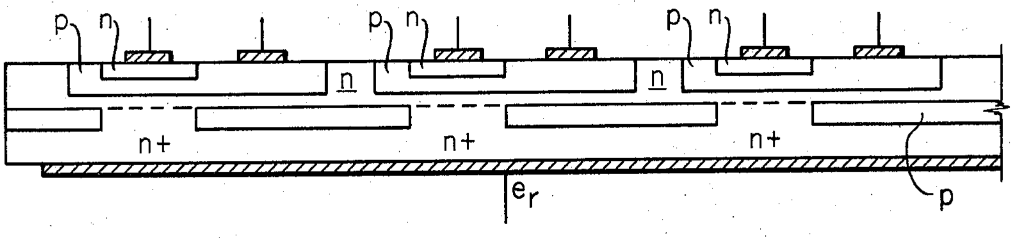
FIGURE 4 shows a plurality of transistors of the type shown in FIGURE 3 used in an integrated microcircuit.

Referring to FIGURE 4, a plurality of devices of the type shown in FIGURE 3 are formed on a single wafer. The inverse emitter connection $e_r$ is made to the body. Due to the higher conductivity in the $n+$ columns, the device will operate at the junction portions 12$a$. The $p$-type ring surrounding the $n+$ column will serve to reduce any injection in the regions of the junction 12$b$ which surround the operating regions.

Figure 5:
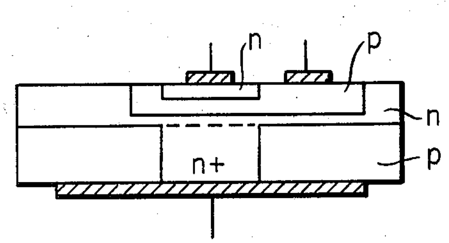
FIGURE 5 shows still another transistor in accordance with the invention.
Figure 6:
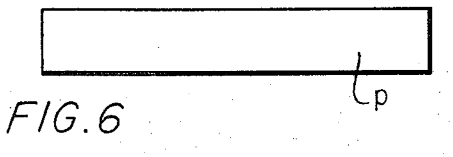
FIGURES 6–11 show the steps in forming a transistor of the type shown in FIGURE 3.

Referring to FIGURE 5, there is shown a device in which the $n+$ column is formed in a $p$-type body to thereby further improve the injection efficiency.

Figure 7:
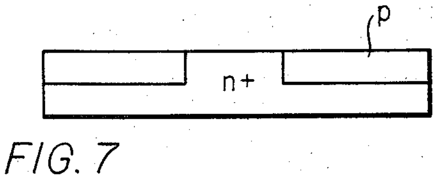
Figure 13:
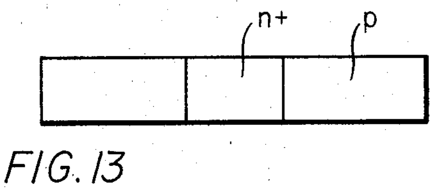
Figure 8:
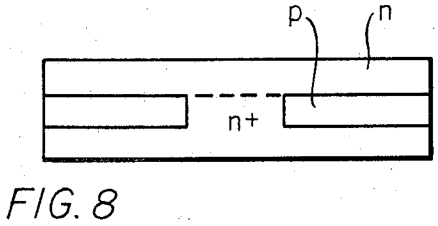
Figure 14:
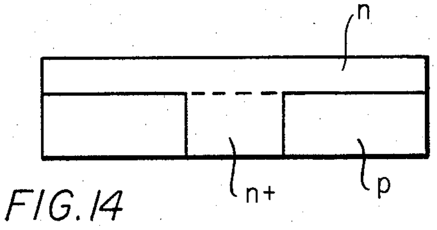
Figure 9:
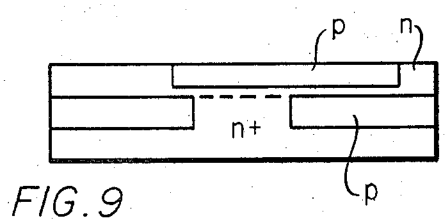
Figure 15:
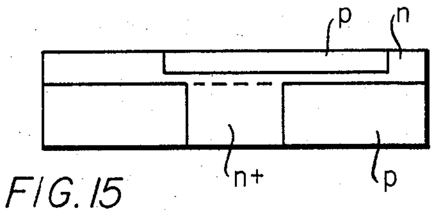
Figure 10:
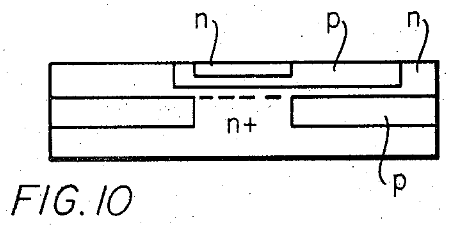
Figure 16:
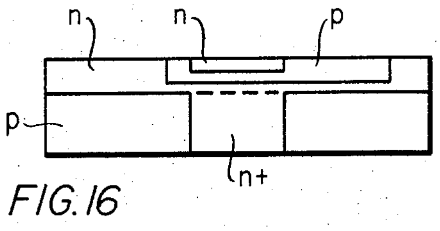
Figure 11:
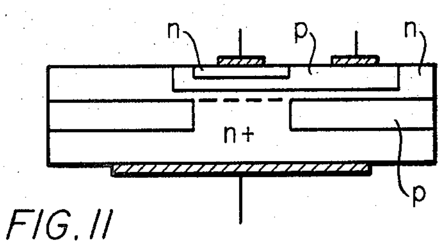

Referring to FIGURES 6–11, there are illustrated the steps in forming a transistor of the type shown in FIGURE 3. A $p$-type wafer having the desired impurity concentration is selected, FIGURE 6. Subsequently, one surface of the wafer is masked leaving a window through which $n+$ regions may be diffused. An $n$-type diffusion is carried out until the diffusion layer from the other surface meets the diffusion layer formed at the window as shown in FIGURE 7. Subsequently, an epitaxial $n$-type layer is grown on one surface of the wafer, FIGURE 8. A subsequent masking operation leaves a window through which the base layer is diffused. The diffusion forms the inset base layer, FIGURE 9. Another masking operation then forms a smaller window through which the emitter $n$-type region is diffused, FIGURE 10. The final step is application of ohmic contacts to the various regions and the attachment of terminal leads, FIGURE 11.

Figure 12:
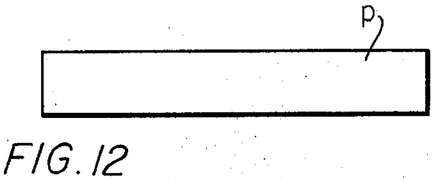
FIGURES 12–17 show a method of forming a transistor of the type shown in FIGURE 5.
Figure 17:
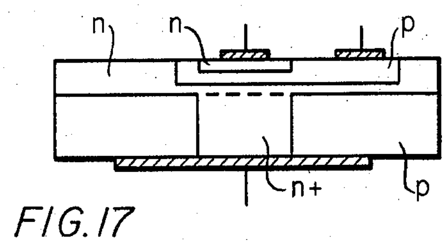

The steps in forming a device in accordance with FIGURE 5 are illustrated in FIGURES 12–17 and comprise selecting a $p$-type wafer having the desired impurity concentration, FIGURE 12. By masking to provide opposed upper and lower windows in the mask and a subsequent diffusion, an $n+$ column is formed in the wafer, FIGURE 13. Subsequently, an epitaxial $n$-type layer is grown on one surface of the wafer, FIGURE 14. The epitaxial layer is then masked and an inset $p$-type base region is formed therein, FIGURE 15. Subsequently, masking and diffusion operations provide an $n$-type emitter region, FIGURE 16. Ohmic contacts are then provided as shown in FIGURE 17.

The transistor shown in FIGURE 2 may be formed by either masking and diffusing into a low doped $n$-type wafer to form the highly doped column or by starting with a highly doped block and masking and out diffusing to form the low doped ring. Subsequent steps may be epitaxial growth followed by masking and diffusion steps to form inset base and emitter regions.

The structure shown in FIGURE 4 may be formed similarly to that shown in FIGURE 3 providing, however, masks which have a plurality of windows properly registered during each operation.

Thus, it is seen that there is provided a transistor which has relatively high inverse alpha and a method of making the same. The transistor can be incorporated in integrated microcircuits having a common emitter configuration.

I claim:

1. A transistor comprising a collector region, a base region forming a base collector junction therewith, and an emitter region forming an emitter base junction of predetermined configuration and area with the base region in which said collector region includes a first portion having a first impurity concentration forming with the base region a base-collector junction, and a second portion of higher impurity concentration spaced from the base-collector junction opposite the emitter region, said second collector portion having substantially the same area and configuration as the emitter region.

2. A transistor as in claim 1 in which said higher impurity concentration portion is surrounded by a region of low impurity concentration.

3. A transistor as in claim 1 wherein said high impurity concentration portion is surrounded by a region of opposite conductivity type.

4. A transistor as in claim 1 wherein said high impurity concentration portion of the collector is a column inset in the collector region.

5. A transistor comprising a collector region, a base region inset into said collector region and forming a base collector junction therewith, an emitter region inset into said base region and forming an emitter base junction of predetermined configuration and area therewith, in which said collector region includes a portion having a first impurity concentration forming a junction with the base region and a portion of high impurity concentration spaced from said junction presenting a face to the emitter of substantially the same area and configuration as the emitter.

6. A transistor comprising contiguous collector, base and emitter regions defining emitter-base and base-collector junctions in which said emitter-base junction has an area substantially less than the base-collector junction, and said collector region includes a portion opposite the emitter-base junction having a greater conductivity than any other portions of the collector region to give a high voltage at the portion of the collector-base junction lying opposite the emitter-base junction when the transistor is operated in reverse connection.

7. A transistor as in claim 6 wherein said portion comprises a column.

8. A transistor comprising contiguous collector, base and emitter regions defining emitter-base and base-collector junctions in which said emitter-base junction has a predetermined configuration and area substantially less than that of the base-collector junction, and said collector region includes a portion of material having a higher conductivity than the remainder of the collector, said portion having substantially the same cross-sectional area and configuration as the emitter-base junction and lying opposite the same whereby to give high voltages at the collector-base junction lying opposite said collector when the device is operated in its reverse connection.

No references cited.

JOHN W. HUCKERT, *Primary Examiner.*

J. D. KALLAM, C. E. PUGH, *Assistant Examiners.*